United States Patent
Ruka et al.

(10) Patent No.: US 6,248,468 B1
(45) Date of Patent: *Jun. 19, 2001

(54) FUEL ELECTRODE CONTAINING PRE-SINTERED NICKEL/ZIRCONIA FOR A SOLID OXIDE FUEL CELL

(75) Inventors: Roswell J. Ruka, Pittsburgh; Shailesh D. Vora, Monroeville, both of PA (US)

(73) Assignee: Siemens Westinghouse Power Corporation, Orlando, FL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/224,157

(22) Filed: Dec. 31, 1998

(51) Int. Cl.$^7$ .................................................. H01M 8/10
(52) U.S. Cl. ........................... 429/40; 429/33; 429/41; 429/44; 429/45
(58) Field of Search ............................ 429/40, 41, 42, 429/43, 44, 45, 33

(56) References Cited

U.S. PATENT DOCUMENTS

| | | | |
|---|---|---|---|
| 3,503,808 | 3/1970 | Agruss et al. | 136/83 |
| 4,490,444 | 12/1984 | Isenberg | 429/31 |
| 4,582,766 | 4/1986 | Isenberg et al. | 429/30 |
| 4,597,170 | 7/1986 | Isenberg | 29/623 |
| 4,847,172 | 7/1989 | Maskalick et al. | 429/30 |
| 5,035,962 | 7/1991 | Jensen . | |
| 5,227,258 | 7/1993 | Ito et al. | 429/40 |
| 5,908,713 | 6/1999 | Ruka et al. . | |

OTHER PUBLICATIONS

PCT International Search Report (3pp.) RDV98–002PCT; international filing date Jan. 12, 1999.
PCT International Application (11pp.) WO 99/16140; International publication date Apr. 1, 1999.
INCO Nickel Powders Properties and Applications, Single Spikey Particles INCO Type 123 Nickel Powder, 20pp. Date Unknown.
J. Am.Ceram Soc. 73{3} Ceramic Fuel Cells, Nguyen Q. Minh et al., 563–88 (1993).
Proceedings of the Fifth International Symposium on Solid Oxide Fuel Cells (SOFC–V), vol. 97–40, p. 815–32 and 851–860 Date Unknown.
J. Electrochem Soc 143, Characterization of Ni–YSZ Anode Degradation for Substrate–Type solid Oxide Fuel Cells, T. Iwata, p. 1521–1525. Date Unknown.

*Primary Examiner*—Stephen Kalafut
*Assistant Examiner*—M. Wills
(74) *Attorney, Agent, or Firm*—Eckert Seamans Cherin & Mellott, LLC

(57) ABSTRACT

A fuel cell structure (2) is provided, having a pre-sintered nickel-zirconia fuel electrode (6) and an air electrode (4), with a ceramic electrolyte (5) disposed between the electrodes, where the pre-sintered fuel electrode (6) contains particles selected from the group consisting of nickel oxide, cobalt and cerium dioxide particles and mixtures thereof, and titanium dioxide particles, within a matrix of yttria-stabilized zirconia and spaced-apart filamentary nickel strings having a chain structure, and where the fuel electrode can be sintered to provide an active solid oxide fuel cell.

15 Claims, 2 Drawing Sheets

FUEL ELECTRODE CONTAINING PRE-SINTERED NICKEL/ZIRCONIA FOR A SOLID OXIDE FUEL CELL

GOVERNMENT RIGHTS

The United States Government has certain rights in this invention pursuant to Contract No. DE-FC26-97FT-34139 awarded by the United States Department of Energy.

BACKGROUND OF THE INVENTION

1. Field of the Invention

The present invention relates to fuel electrodes for solid oxide fuel cells and their method of manufacture.

2. Background Information

Solid oxide electrolyte fuel cells ("SOFC") are well known in the art and are described generally in U.S. Pat. No. 4,490,444 (Isenberg). Such an SOFC can be of a flat plate, tubular, or other configuration, and typically operates at a temperature of from 700° C. to 1100° C., with a solid ceramic electrolyte disposed between two solid ceramic electrodes. In operation, one electrode is in contact with oxygen or air ("air electrode") and the other electrode is in contact with fuel ("fuel electrode").

Nickel/zirconia cermet (ceramic-metal) fuel electrodes are typically used for SOFC's, as exemplified by the tubular configuration of the Isenberg '444 patent. Seven properties, in particular, are desired to produce a commercially viable fuel electrode of this type. These are: high conductivity; adherence which does not deteriorate due to aging or thermal cycling; a large area of electrochemically active sites at the electrode/electrolyte interface; chemical and physical stability over a wide range of fuel atmospheres; minimal microstructural changes with operating time (since such changes are often accompanied by deterioration of SOFC voltage performance); adequate porosity, that is 25% to 45% porous by volume, to minimize concentration polarization; and, very importantly, lower fabrication costs.

A variety of procedures have been tried to satisfy these requirements, as described in U.S. Pat. Nos. 3,503,808 and 5,227,258 (Agruss et al. and Ito et al., respectively); Satoshi Ohara et al., *Proc. Fifth International Symposium on Solid Oxide Fuel Cells*, Vol. 97-40, p. 815; A. Tsoga et al., ibid, p. 823; R. Wilkenhoner et al., ibid, p. 851; Tomoo Iwata, *J. Electrochem Soc.*, 143, p. 1521 (1966); an Nguyen Q. Minh, *J. Am. Ceram. Soc.*, 76 [3], p. 563–588 (1993).

The most successful process to make these fuel electrodes to date has been the use of an electrochemical vapor deposition ("EVD") method. This EVD method forms a yttria stabilized zirconia "skeleton" within and surrounding a porous matrix of nickel particles, as described in U.S. Pat. Nos. 4,582,766 and 4,597,170 (Isenberg et al. and Isenberg, respectively). In one embodiment of this EVD process, nickel fibers, about 3 mm to 15 mm long and 0.01 mm to 0.05 mm diameter, are deposited within the fuel electrode as described in U.S. Pat. No. 4,847,172 (Maskalick et al.). Alternate sintering processes, not requiring expensive EVD equipment, offer a potential cost saving if they are able to meet all technical objectives. One of the serious problems encountered by simple sintering processes for forming the cermet fuel electrode has been microstructural changes in the cermet which, can cause deterioration of the SOFC voltage over time. Thus, what is needed is an improved electrode and method of electrode manufacture which meets all the previous requirements, but which uses materials that can allow ease of low cost fabrication.

SUMMARY OF THE INVENTION

Therefore, it is one of the main objects of this invention to provide a low cost sinter-fabrication process, providing fuel electrodes with improved performance compared to previous sintered electrodes.

It is another main object of this invention to provide a "green", that is, pre-sintered, fuel electrode structure with a large number of potential active sites providing potential high conductivity upon sintering.

These and other objects of the invention are accomplished by providing a fuel cell structure comprising a pre-sintered nickel/zirconia fuel cell electrode and an air electrode, with a ceramic electrolyte disposed between the electrodes, where the pre-sintered fuel electrode comprises (1) at least one of nickel oxide, cobalt oxide and cerium dioxide particles and (2) titanium dioxide particles, within a matrix of yttria stabilized zirconia particles and spaced-apart filamentary nickel powder beads, where the beads and filaments of the filamentary nickel powder have contact points throughout the fuel electrode structure. Preferably the beads have a average particle size between about 2.0 micrometers and 2.8 micrometers diameter.

The invention also comprises a method of forming a pre-sintered, exterior fuel electrode on a ceramic electrolyte comprising, applying to a ceramic electrolyte surface a fuel electrode slurry composition comprising the admixture in a liquid media:

i) at least one of nickel oxide, cobalt oxide and cerium dioxide particles,
ii) titanium dioxide particles,
iii) filamentary nickel powder beads, and
iv) yttria stabilized zirconia particles, to provide a non-sagging coating of the fuel electrode composition having a firm, pre-sintered fuel electrode structure attached to the electrolyte, where the fuel electrode structure contains nickel oxide particles and titanium dioxide particles within a matrix of yttria stabilized zirconia and spaced-apart filamentary nickel powder beads where the beads and filaments of the filamentary nickel powder beads have contact points throughout the fuel electrode structure.

Preferably the process will be a dipping process using a viscous, homogeneous slurry of the composition in a liquid media, and removal of the ceramic electrolyte surface from the slurry prior to drying.

These new fuel electrode structures provide, upon sintering, high conductivity, good adherence to the solid electrolyte, a large area of electrochemically active sites, chemical and physical stability, minimal structural changes at operating temperatures over time, low cost fabrication and good porosity for fuel gas interaction. The use of the term "green" structure or electrode here will be interchangeable with the word "pre-sintered", that is, a structure or electrode that is firm, formed, but not cured or sintered, and which may contain various organic plasticizers, binders, solvents or other additives that will generally be "burned-off" during intense heating or sintering.

BRIEF DESCRIPTION OF THE DRAWINGS

The invention will become more apparent by reading the following detailed description in conjunction with the drawings, which are shown by way of example only, wherein.

DESCRIPTION OF THE PREFERRED EMBODIMENTS

Figure 1:
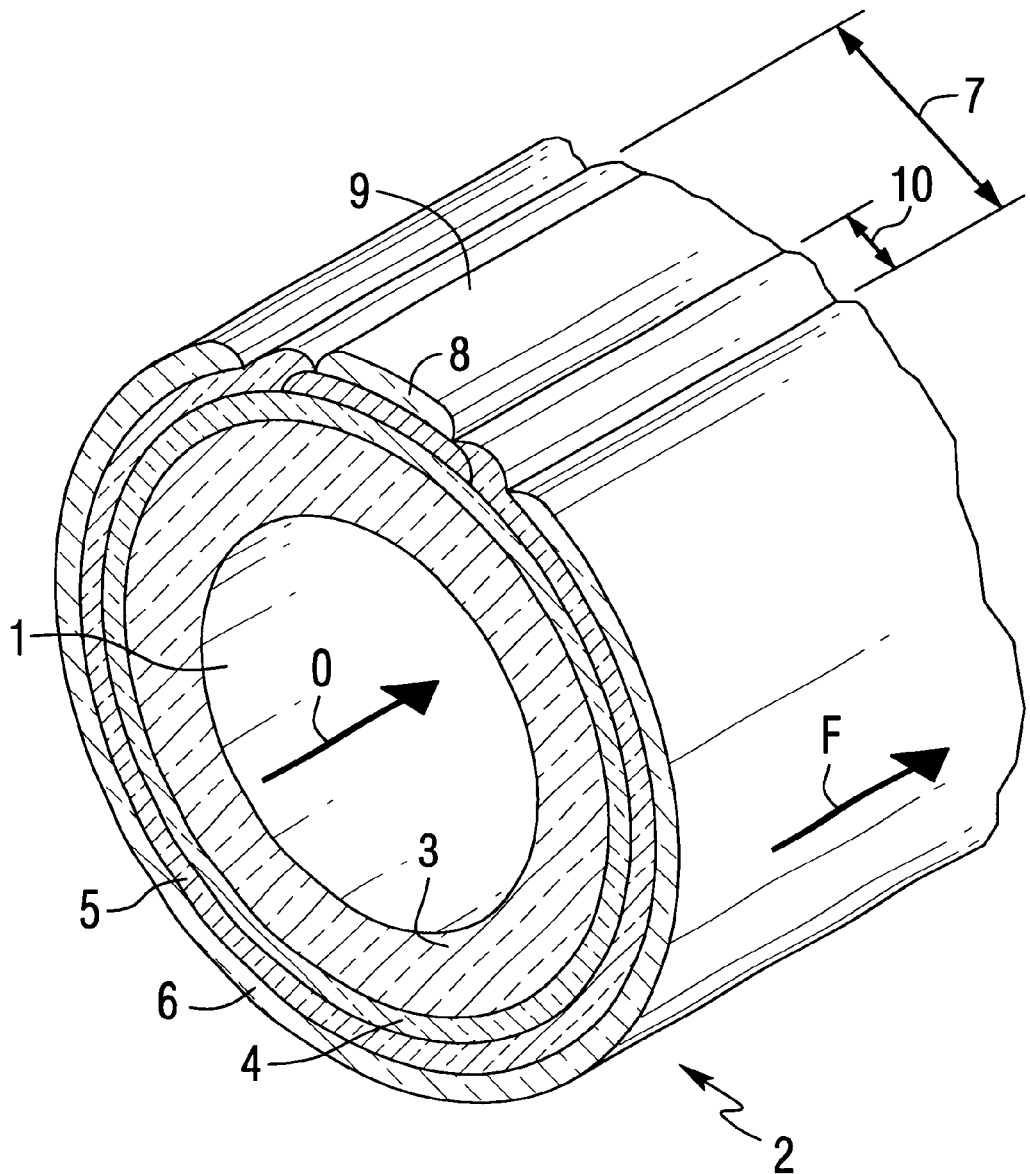
FIG. 1 is an isometric view in section of one embodiment of a tubular electrochemical cell according to this invention.

Referring now to the Drawings, FIG. 1 shows a tubular, solid oxide electrolyte, electrochemical cell, such as a fuel cell, with air or oxygen flowing through the center 1 of the cell 2. The air (oxygen) permeates through optional porous support tube 3 to air electrode 4, where oxygen is converted to oxygen ions. In most instances, the air electrode is thicker than shown and is a self-supporting structure not requiring the support tube. The oxygen ions are conducted through electrolyte 5 to cermet fuel electrode anode 6, where they react with fuel, F, such as $H_2$, CO, $CH_4$, etc., to generate electricity. As can be seen, the fuel electrode in this configuration is an exterior electrode, where the electrolyte is in tubular form and in contact with an interior air electrode.

Of course, this invention is not limited to tubular constructions, and flat plate or monolithic type designs, well known in the art, are considered within the scope of this invention. For the sake of convenience, the tubular design will be emphasized in the description of the invention.

Also shown in FIG. 1 is a longitudinal space 7 containing an interconnection 8 for making electrical connections from the underlying air electrode to the fuel electrode 6 of an adjacent cell tube (not shown). Electronically insulating gap 10 is also shown. A metal or fuel electrode type of material 9 may be coated over interconnection 8. A detailed description of the general operation of the solid oxide fuel cell, along with appropriate description of useful support, air electrode, and interconnection materials, can be found in U.S. Pat. No. 4,490,444 (Isenberg).

The most useful air electrode cathodes are made of doped and undoped oxides or mixtures of oxides in the perovskite family, such as $LaMnO_3$. The electrolyte material 5 is typically an oxide having a fluorite structure or a mixed oxide in the perovskite family, but other simple oxides, mixed oxides, or mixtures of simple and mixed oxides can be used. The preferred electrolyte material is stabilized zirconia, a readily available commercial material. The zirconia may be stabilized, that is, doped, with a number of elements, as is well known in the art, but rare earth element stabilized zirconia, especially yttria stabilized zirconia, is preferred, as it has excellent oxygen ion mobility. a preferred composition is $(ZrO_2)_{0.9}(Y_2O_3)_{0.1}$ as that material works well in solid oxide electrochemical cells. Other mixed oxides can be used including yttrium doped thorium oxide. The method of this invention is applicable to oxide layers which transfer oxygen in any form including monatomic oxygen as well as ionic oxygen.

Figure 2:
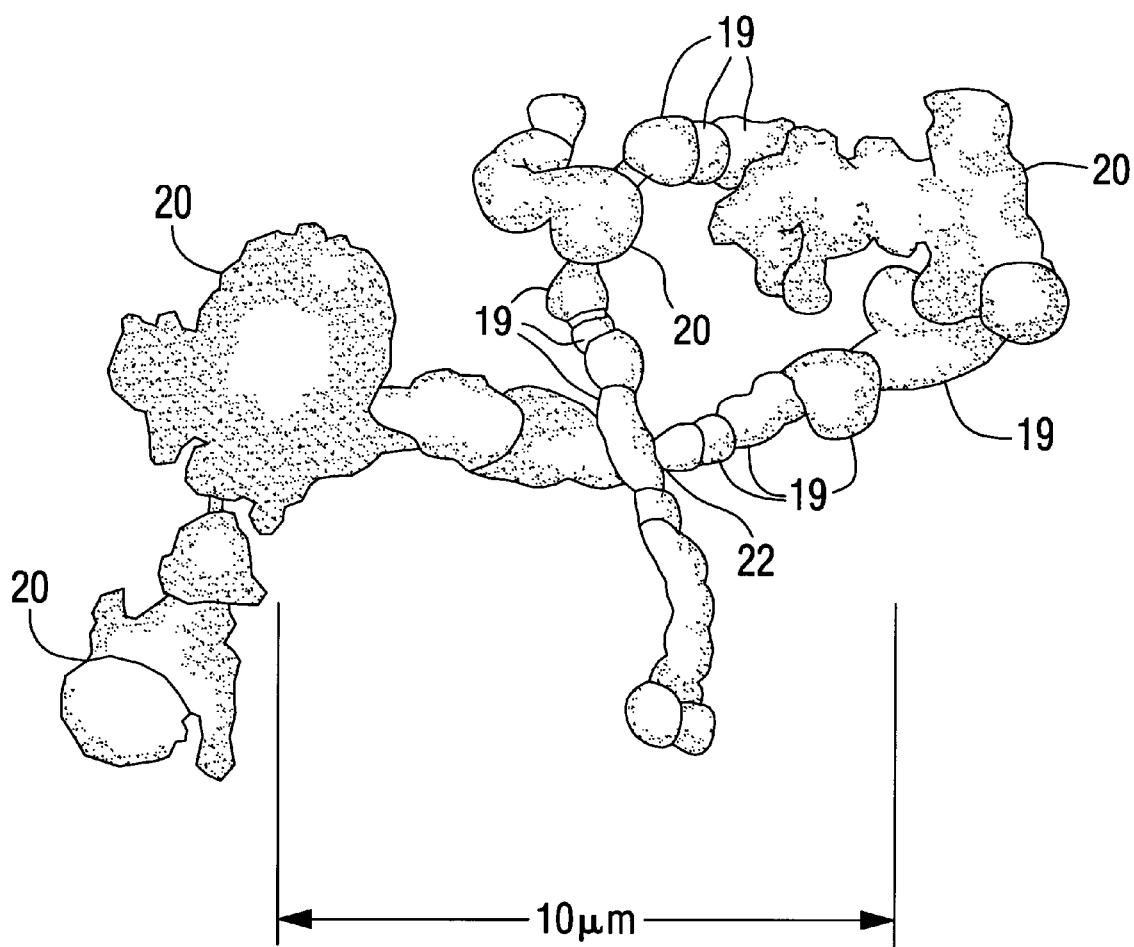
FIG. 2, which best illustrates the invention, is a simplified isometric illustration, partly in section, showing the porous, pre-sintered, "green", fuel electrode anode structure of this invention with spikey filamentary chains of nickel disposed within the electrode as a matrix structure.

In FIG. 2, the cermet fuel electrode anode 6 in FIG. 1) is shown in the "green" state, before sintering, in an idealized, magnified simplified, cross sectional view. Where the cross-section shows several filamentary strings of nickel 19 particles. For sake of clarity, the filamentary strings 19 are all shown with circular cross-sections, whereas they will, in fact, have a wide variety of irregular cross-sections. These long nickel filamentary strings 19, have a chain-like matrix structure containing beads particles 20 resembling lumpy spikey spheres. The strings 19, which contact each other at a very large number of cross-over points 22 throughout the volume of the "green" fuel electrode structure, provide a matrix for the other materials in the fuel electrode and provide a larger number of active sites and potentially high conductivity upon sintering. Thus, the filamentary strings 19 are disposed within the fuel electrode structure 6, and provide a random directional matrix as shown. The filamentary strings 19 are preferably in the form of a felt.

The chain-like strings 19 can be disposed within a part of or all of the thickness of fuel electrode structure 6 of FIG. 1. Upon sintering, at from about 1200° C. to 1400° C., the metal particles and nickel filaments bond in intimate contact at a great many points in the final fuel electrode structure.

The nickel filaments are commercially available, and are described in a *INCO Nickel Powders Properties And Applications* brochure, published by International Nickel Inc., pp. 6–8. The brochure states that:

The filamentary powders are spikey spheres bonded together in chain-like structures resembling strings of beads. Because the filaments interfere with the spacing of each other, the powders exhibit low apparent densities. The apparent density measurement is a crude function of the length of strings of beads, that is, the lower the density, the longer the string of beads. The other physical property that is meaningful is the particle size as measured by the Fisher Subsieve Size, which will be indicative of the bead diameter. The filamentary powders are produced with a variation in diameter, length and degree of branching. Homogeneous batches result from fluidized air blending. The lowest density filaments are generally longer, more highly branched, and thinner in diameter, while the higher density filaments tend to be shorter and thicker.

Typical chemical analysis, according to the brochure, shows that the powders constitute 0.25 wt. % max carbon, and 0.15 wt. % max oxygen, with minor amounts of sulfur and iron, and the balance nickel. The average particle size (Fisher Subsieve Size) is from 2.2 micrometers to 2.8 micrometers, the apparent density is from 0.5 g/cc (gram/cubic centimeter) to 0.65 g/cc and the specific surface area is 0.68 $m^2/g$ (meters squared/gram). The Fisher Subsieve Size pertains to the diameter of the individual spheres in the filaments. Gross particle sizes are variable and are much larger.

The brochure states that the high surface area and low apparent density of the powders are properties which permit production of sintered nickel products with controlled porosity. End use applications include nickel-alkaline battery plates, fuel cell electrodes, and metal filters. The brochure also states that electrodes made from these low density, filamentary powders are very porous, enabling high loading of thin deposits of active mass. Electrodes made from these high purity powders offer excellent corrosion resistance in alkaline media. In addition to applications requiring controlled porosity, these powders are used for conventional powder metallurgy items.

On the basis of applicants' tests, filamentary nickel powder beads having particle sizes between about 2.0 micrometer to 2.8 micrometer, apparent densities between about 0.5 g/cc to 0.75 g/cc and specific surface areas between about 0.060 $m^2/g$ to 0.75 $m^2/g$ are most preferred. A simplified cross-section of a "green" fuel electrode, based on photomicrographs, is shown in FIG. 2. Beads 20 are apparent, with connecting filaments 19 crossing over each other at cross-over points 22. The chain length with associated cross-over points, it is thought, greatly help provide additional active sites and physical stability upon sintering.

A preferred fuel electrode anode thickness for this invention is from 100 micrometers to 300 micrometers (0.10 mm to 0.30 mm) preferably from 100 micrometers to 200 micrometers (0.10 mm to 0.20 mm). Oxides of nickel, cobalt, and alloys and mixtures thereof can be used as precursors to metal particles embedded within the skeletal and matrix structure of fuel electrode structure. The nickel oxide or cobalt oxide particles, if they are used, will have diameters or dimensions roughly corresponding to diameters from 1 micrometer to 40 micrometers (0.001 mm to 0.04 mm), preferably from 1 micrometer to 5 micrometers (0.001 mm to 0.005 mm). Nickel oxide will herein be considered equivalent to cobalt oxide within the fuel electrode structure of this invention although nickel oxide is preferred. The nickel oxide should be present from about 0 wt. % to 35 wt. % of the fuel electrode slurry.

Other useful metal oxide particles particularly advantageous in this fuel electrode are titanium dioxide ($TiO_2$) particles, having diameters or dimensions roughly corresponding to diameters of 0.2 micrometer to 10 micrometers (0.0002 mm to 0.01 mm), preferably from 0.2 micrometer to 1 micrometer (0.0002 mm to 0.001 mm). The titanium dioxide is essential in providing superior conductivity in the sintered fuel electrode. It should be present from about 0.5 wt. % to 3 wt. % of the fuel electrode slurry.

Nickel acetate (Ni(OOCCH$_3$)$_2$·4H$_2$O) solution or crystals can also be added in minor effective amounts to help improve conductivity. Cerium dioxide (CeO$_2$) particles are also helpful in providing good conductivity properties. The cerium dioxide can be present from about 0 up to about 5 wt. % of the fuel electrode slurry, and have diameters or dimensions roughly corresponding to diameters of 0.2 micrometer to 10 micrometers (0.0002 mm to 0.01 mm). At least one of cerium dioxide, nickel oxide or cobalt oxide will be present in the presintered fuel electrode.

In this invention, yttria stabilized zirconia, preferably having a composition of $(ZrO_2)_{0.92}(Y_2O_3)_{0.08}$, is added as a powder to help provide a matrix type skeletal structure, along with the nickel filaments, and the particles of nickel or cobalt oxide. The stabilized zirconia will be present from about 10 wt. % to 25 wt. % of the fuel electrode slurry. This will generally provide, upon sintering, a ratio of nickel (Ni) to yttria stabilized zirconia (YSZ) by weight, in the weight range of 1 part YSZ to 2.25 to 3.5 parts Ni. The yttria stabilized zirconia powder will have diameters or dimensions roughly corresponding to diameters of 0.05 micrometer to 0.2 micrometer (0.00005 mm to 0.0002 mm). The stabilized zirconia is essential to help form the backbone matrix of the fuel electrode.

Liquid media, such as organic binders, organic plasticizers, and solvents for them are also constituents of the fuel electrode slurry. Useful binders include, for example, polyvinyl butyral. Polyacrylic acid helps adjust fluid properties, such as viscosity. Useful plasticizers include, for example, glycerol, and the like. Useful solvents include one or a mixture of propanol, isopropanol, 2-butoxyethanol, and the like, plus small amounts of water. All these ingredients are added in amounts effective to provide binder, viscosity adjustment, plasticizer or solvent effects and provide a suitable slurry viscosity. Of course, other additives, such as dispersants, or defoamers can be added as part of the liquid media to improve properties of the slurry for coating purposes. Preferably the slurry will be applied by a dipping process, in a single step, as a single layer. The organic constituents affect the viscosity of the slurry, the adhesion and resistance to chipping of the "green", unsintered fuel electrode layer, and the resistance to settling and separation of the heavier inorganic species after milling and shaking the slurry, all of which are important to the reliability of the process.

For a spray application process, the slurry can be modified by adding additional solvent to lower the viscosity to a value appropriate to the spray equipment used as ordinarily specified by the manufacturer. The dip process is selected as the most cost effective process, since there is less material loss by this process, and adherence and porosity are easily controlled. In the dip process, best mixing and a most homogeneous slurry can be achieved if the median particle sizes of all the powders used in the slurry are less than 10 micrometers. The mixing can be in a ball mill, but any such mixing should not destroy any substantial amount of the filamentary nickel. The ratio of yttria stabilized zirconia to nickel (including nickel derived from the NiO present) is important in that it affects not only the thermal expansion of the composite, but the conductivity and the resistance to a voltage cycling effect, found when the amount of zirconia is too low. However, if the amount of zirconia is too high the conductivity of the fuel electrode becomes lower than desired and the cell performance is adversely affected.

The invention will now be further clarified by consideration of the following Example.

EXAMPLE 1

A fuel electrode slurry was prepared, at about 25° C., and contained the materials set forth in Table 1 below:

TABLE 1

| Material | Weight % | Particle Size Micrometers |
|---|---|---|
| Filamentary Nickel Particles* | 40 | 2.2–2.8 |
| Nickel Oxide Particles (NiO) | 11 | up to 20 |
| Yttria Stabilized Zirconia** | 15 | 0.05–0.15 |
| Cerium Dioxide Particles (CeO$_2$) | 1 | 3–20 |
| Titanium Dioxide Particles (TiO$_2$) | 1 | 2–3 |
| Polyacrylic Acid, Polyvinyl, Butyral*** and Glycerol**** | 9 | |
| 1 Propanol Solvent | 23 | |

*These filamentary particles are manufactured by INCO as Type Ni "255" Nickel Filamentary Powder and have an apparent density of 0.5–0.65 g/cc
**This zirconia has the formulation $(ZrO_2)_{.92}(Y_2O_3)_{.08}$ and is manufactured by TOSOH as TZ8Y zirconia powder
***Used as a binder
****Used as a plasticizer The materials were mixed in a ball mill for 5 to 10 hours to provide a homogeneous, viscous slurry having a viscosity at 25° C. of between about 3000–6000 centipoise at 20 RPM on a Brookfield viscometer. This fuel electrode slurry was transferred to a 2 meter tall, tubular container to coat an air electrode-electrolyte assembly with the fuel electrode slurry.

A fuel cell structure similar to that shown in FIG. 1 of the drawings, but without support 3, fuel electrode 6, or metal layer 9, and, with a thick self-supporting air electrode 4, was hand-dipped vertically, lengthwise, into the air electrode slurry within the 2 meter tall container, at about 25° C. The dip occurred after the interconnection, 8 in FIG. 1 of the drawings, had been covered with plastic tape to prevent contact with the slurry. The fuel cell structure that was dipped was 1.8 meters long, with a diameter of about 2.2 cm and was capped at the end that was dipped into the slurry to prevent fuel electrode deposition on the interior air electrode surface. The cell was immersed between 150 cm and 170 cm into the slurry. The cell was then attached to a mechanism specifically built to slowly pull the tube out of the coating slurry to allow slow air drying, to evaporate solvent, and to prevent sag or dripping, thus providing a uniform firm, "green" coating layer about 100 micrometers thick on the cell. The tape over the interconnection was then removed.

In the "green" state, before sintering, it is thought that the filamentary, spikey sphere strings of the "255" nickel provide a very large number of separate, discrete contact points with itself and the other, much larger nickel oxide particles, as well as with the cerium dioxide and titanium dioxide particles, so that upon subsequent sintering, the fuel electrode provides high conductivity, good adherence, minimal microstructural changes and a large number of active sites.

The cell with the attached "green" fuel electrode was left to air dry at 25° C. for about 1–24 hours, after which it was sintered in a furnace for 4 hours at a temperature of from about 1200° C. to 1400° C. with the fuel electrode in a reducing environment and the air electrode in an oxidizing environment. The organic components of this slurry were removed in the early heating stages of the sintering process, in which the fuel electrode structure was subjected to a reducing atmosphere containing hydrogen and water, leaving all nickel components in the metallic form while burning off the organic components in the "green" (unsintered) state which had not already volatilized in processing. An alternate sintering atmosphere for the fuel electrode may contain carbon monoxide and carbon dioxide or their mixtures with hydrogen and water. Above about 500° C.–600° C., H$_2$O or CO$_2$ is not required since these are present only as an aid in burning off residual organics in the "green" fuel electrode layer.

The sintered, final, active fuel cell was then put on test and has been in experimental operation over 1500 hours. It is technically equivalent in performance to SOFC's using the fuel electrodes formed by the EVD process. The SOFC with this type of fuel electrode also withstood substantial thermal cycling. No voltage deterioration has been detectable in over 1500 hours of operation including 16 thermal cycles.

In order to see if substantial filamentary form remained for the INCO Type Ni 255 material a slurry was made similar to the previous description but with an excess of filamentary nickel so that its structure could be observed. This coating was fired at 700° C. to avoid sintering, maintain filamentary structure yet evaporate solvent and burn off other organics. The "green" structure was fractured and not buffed. Photomicrographs with a scanning electron microscope were taken and a substantial filamentary structure was seen to be present despite the fairly long ball milling. Filamentary nickel particles were shown with long strands crossing each other with associated larger spheres, very similar to that shown in FIG. 2 of the drawings.

COMPARATIVE EXAMPLES

A slurry was prepared as in Example 1, only filamentary nickel particles having a particle size in the range of 2.6–3.3 micrometers, an apparent density of 0.75–0.95 g/cc, and a specific surface area of 0.58 m$^2$/g (sold commercially under the trade name INCO Type Ni "287" Nickel Filamentary Powder) was substituted for the Type Ni "255" powder used in Example 1; with the results, while good, not being as promising as with the Type Ni "255" powder.

Also, a slurry was prepared as in Example 1, only single spikey particulate nickel powder was used, having a particle size in the range of 3–7 micrometers, an apparent density of 1.8–2.7 g/cc and a specific surface area of 0.34–0.44 m$^2$/g (sold commercially under the trade name INCO Type "123" Nickel Powder). This Type "123" powder did not have a bead or filamentary structure associated with the particles, and on test the fuel cell was lower in conductivity.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. A fuel cell structure comprising a pre-sintered nickel/zirconia fuel electrode and an air electrode, with a ceramic electrolyte disposed between the electrodes, where the pre-sintered fuel electrode is a single layer which comprises: (1) at least one of nickel oxide, cobalt oxide and cerium dioxide particles, and (2) titanium dioxide particles, said particles disposed within a matrix of yttria stabilized zirconia and spaced-apart long nickel filamentary strings having a chain structure, containing nickel bead particles in the chain, where the nickel bead particles and the chain structure of the filamentary nickel strings have contact points throughout the single layer fuel electrode structure.

2. The fuel cell structure of claim 1, where the pre-sintered fuel electrode contains cerium dioxide particles.

3. The fuel cell structure of claim 1, where the beads contained in the filamentary nickel strings have a particle size between about 2.0 micrometers and 2.8 micrometers diameter.

4. The fuel cell structure of claim 1, where the specific surface area of the filamentary nickel strings is between 0.60 m$^2$/g and 0.75 m$^2$/g, and their apparent density is between 0.5 g/cc and 0.75 g/cc.

5. The fuel structure of claim 1, where the cell is selected from a tubular or flat plate configuration.

6. The fuel structure of claim 1, sintered at a temperature of from about 1200° C. to 1400° C. to provide an active solid oxide fuel cell.

7. The fuel cell structure of claim 6, where the weight ratio of nickel to zirconia is about 3 parts nickel to 4.5 to 5.5 parts zirconia.

8. A method of forming a pre-sintered, exterior fuel electrode on a ceramic electrolyte comprising, applying to a ceramic electrolyte surface a fuel electrode slurry composition in a single step as a single layer said composition comprising the admixture in a liquid media:
   i) at least one of nickel oxide particles, cobalt oxide particles and cerium dioxide particles,
   ii) titanium dioxide particles,
   iii) long nickel filamentary strings having a chain structure, containing nickel bead particles in the chain, and
   iv) yttria-stabilized zirconia powder, to provide a non-sagging, single layer coating of the fuel electrode composition having a firm, pre-sintered fuel electrode structure attached to the electrolyte, where the fuel electrode structure contains the at least one of nickel oxide particles, cobalt oxide particles and cerium dioxide particles and the titanium dioxide particles disposed within a matrix of yttria-stabilized zirconia particles and spaced-apart long nickel filamentary strings having a chain structure, containing nickel bead particles in the chain.

9. The method of claim 8, where cerium dioxide particles are contained in the admixture.

10. The method of claim 8, where the admixture is a viscous, homogeneous slurry, in a liquid media, where the air electrode-electrolyte assembly is removed from the slurry prior to a drying step, where the filamentary nickel strings have a specific surface area between 0.60 m$^2$/g and 0.75 m$^2$/g, and an apparent density between 0.5 g/cc and 0.75 g/cc.

11. The method of claim 8, where the beads contained in the filamentary nickel strings have an average particle size between about 2.0 micrometers and 2.8 micrometers diameter, and the admixture is applied in a dipping process.

12. The method of claim 10, where the admixture is applied in a dipping process in a single step as a single layer.

13. The method of claim 11, where the median particle sizes of all the materials in the slurry are less than 10 micrometers.

14. The fuel cell structure of claim 1, where the filamentary nickel strings have apparent density between 0.5 g/cc and 0.65 g/cc.

15. The method of claim 8, where the filamentary nickel strings have an apparent density between 0.5 g/cc and 0.65 g/cc.

* * * * *